(No Model.) 3 Sheets—Sheet 1.
T. W. VAN HOESEN.
MACHINE FOR GRINDING GLASS TUBES.
No. 580,913. Patented Apr. 20, 1897.
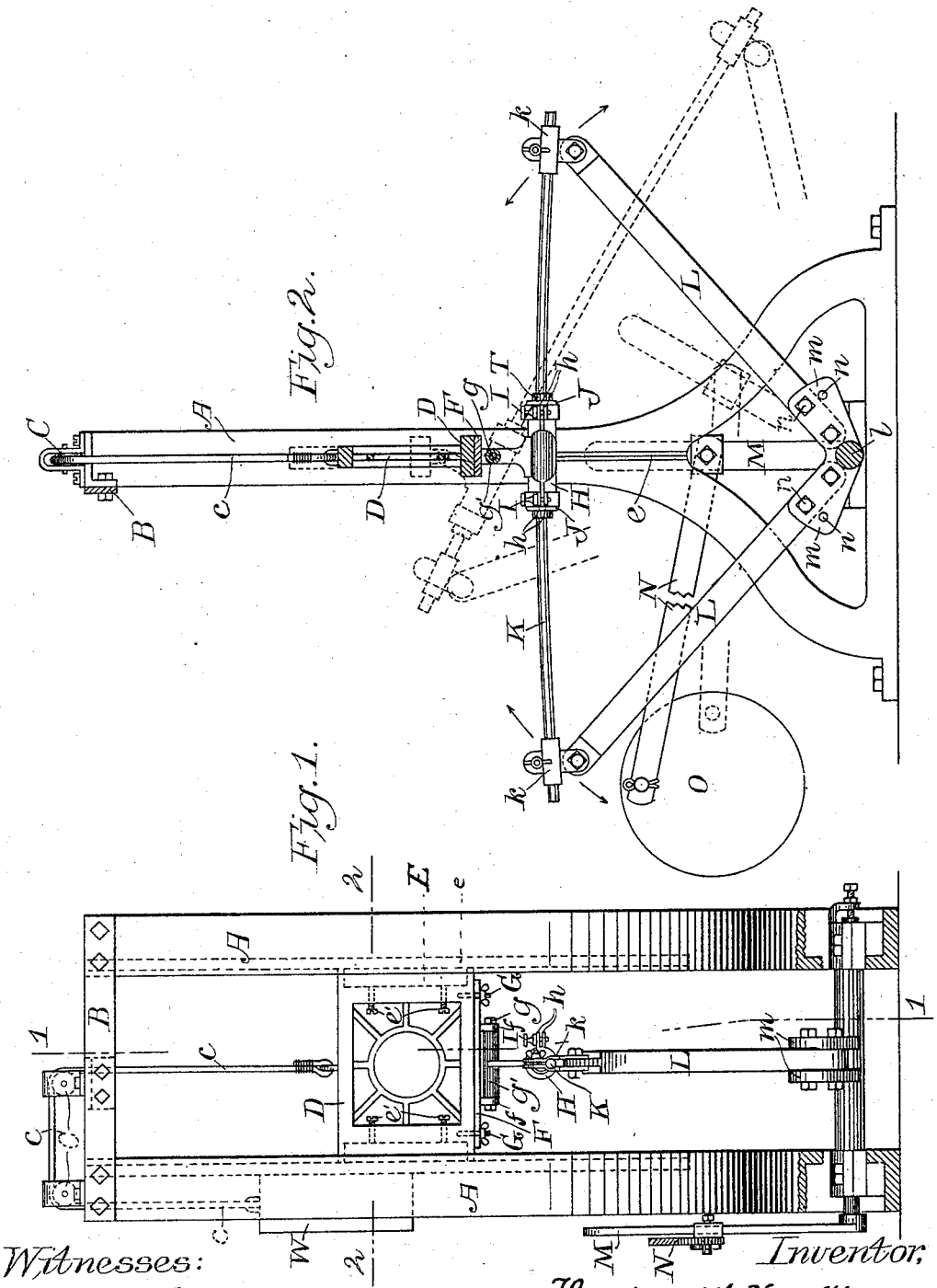
Witnesses:
J. W. Fisher.
Grace T. Many.
Inventor:
Theodore W. Van Hoesen
by Ward & Cameron
Attorneys

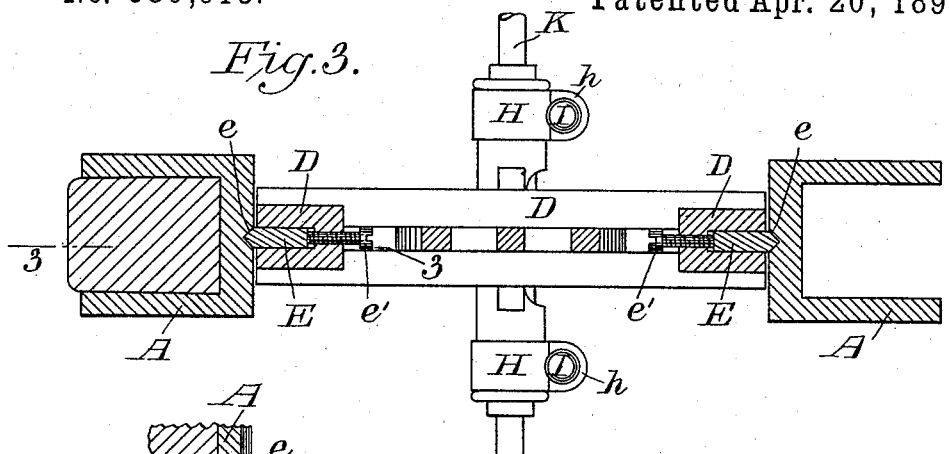
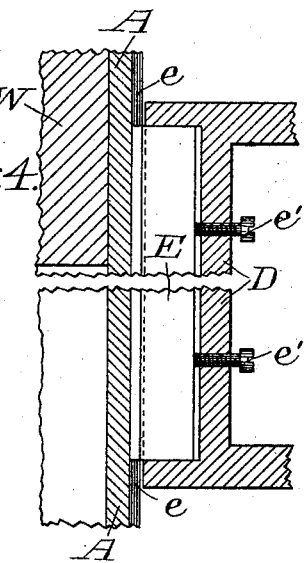
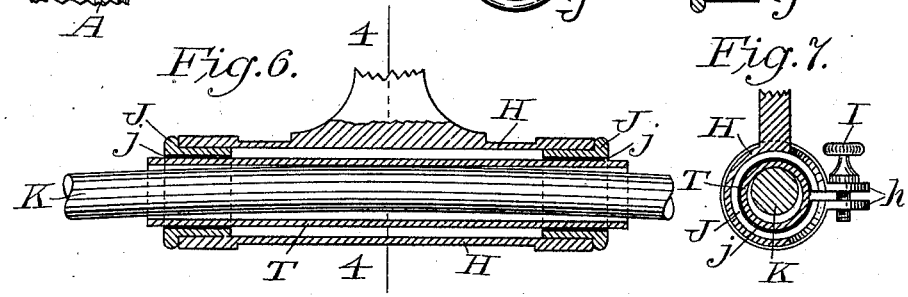
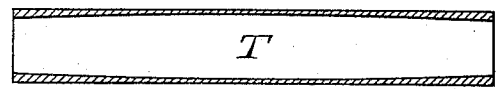

(No Model.) 3 Sheets—Sheet 3.
T. W. VAN HOESEN.
MACHINE FOR GRINDING GLASS TUBES.
No. 580,913. Patented Apr. 20, 1897.
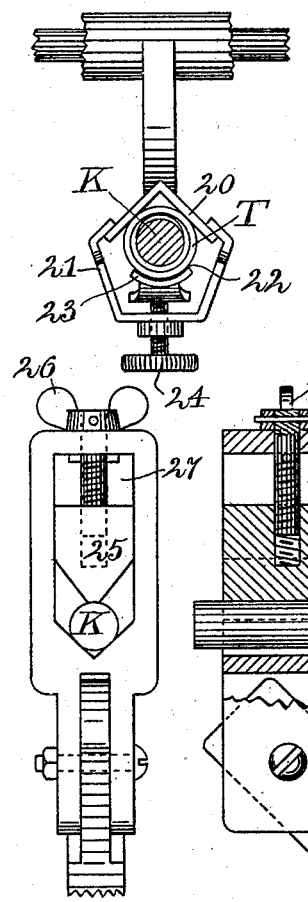
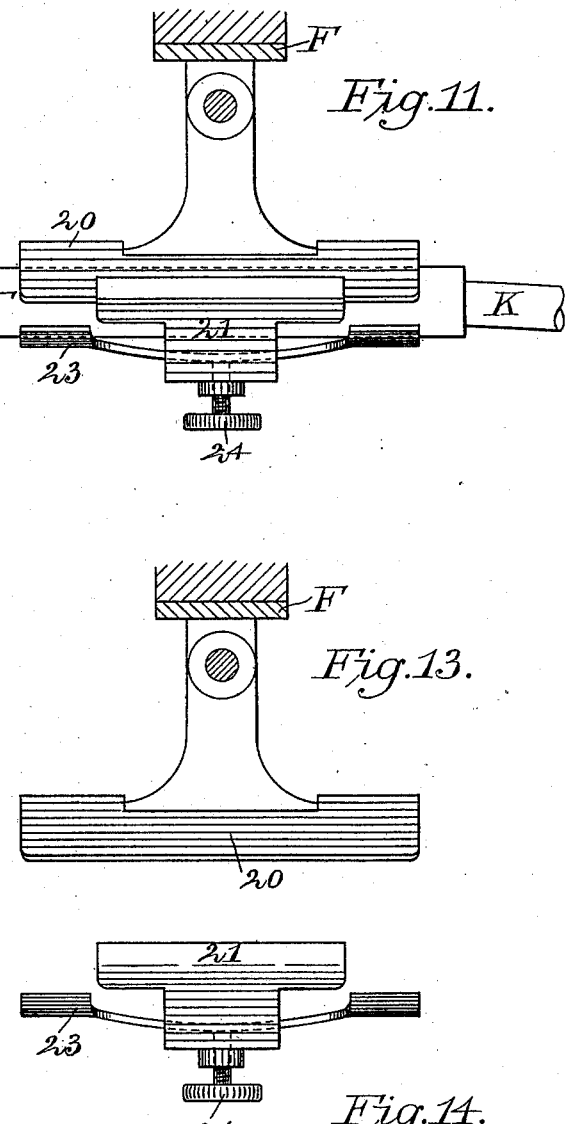
Fig. 12. Fig. 11. Fig. 13. Fig. 15. Fig. 16. Fig. 14.
Witnesses:
J. W. Fisher.
Grace T. Many.
Inventor,
Theodore W. Van Hoesen,
by Waldo Cameron.
Attorneys

UNITED STATES PATENT OFFICE.

THEODORE W. VAN HOESEN, OF TROY, NEW YORK.

MACHINE FOR GRINDING GLASS TUBES.

SPECIFICATION forming part of Letters Patent No. 580,913, dated April 20, 1897.

Application filed February 14, 1896. Serial No. 579,256. (No model.)

*To all whom it may concern:*

Be it known that I, THEODORE W. VAN HOESEN, a citizen of the United States, residing at the city of Troy, county of Rensselaer, and State of New York, have invented a new and useful Machine for Grinding Glass Tubes, of which the following is a specification.

My invention relates to machines for grinding the interior surface of a glass tube; and the object of my invention is to provide a machine for grinding the interior of a spirit-level glass at the portion thereof within the limits of the movement of the bulb and so ground that the difference in the thickness of the glass shall be proportioned after grinding equally from the center of the tube. I attain this object by means of the mechanism illustrated in the accompanying drawings, in which—

Figure 1 is a front elevation. Fig. 2 is a section along the line 1 1 on Fig. 1. Fig. 3 is a section along the line 2 2 on Fig. 1. Fig. 4 is a section along the line 3 3 on Fig. 3. Fig. 5 is a detail view of the adjusting-plate. Fig. 6 is a sectional view of the tube-carrier. Fig. 7 is a cross-section along the line 4 4 on Fig. 6. Fig. 8 is an end view of the collar. Fig. 9 is a sectional view of the collar. Fig. 10 is a sectional view of a tube after being ground. Fig. 11 shows a modified form of the carrier. Fig. 12 is an end elevation of the modified carrier. Fig. 13 is a view of the upper portion of the modified carrier shown in Fig. 11. Fig. 14 is a view of the lower portion of the modified carrier shown in Fig. 11. Fig. 15 shows a modified form of securing the tube in position, and Fig. 16 is a section of Fig. 15.

Similar letters and numerals refer to similar parts throughout the several views.

In order that a spirit-level tube shall be sensitive and adapted for use particularly on mechanical instruments, it is necessary that the interior of the tube should at the center be larger in diameter than points more remote from the center and that the glass forming the tube should be ground smooth and gradually grow thicker in minute degrees in order that the bulb may pass readily from the center toward each end as the level is raised or lowered, and so constructed that by the position of the bulb in the tube the degree in which the tube is out of horizontal can be accurately determined. One means of accomplishing this result is that described in the drawings.

The frame, consisting of the uprights A and top cross-piece B, is suitably secured to the floor and provided on the top of the cross-piece B with pulleys C, upon which the rope c, carrying the weight W, is attached at one end and outside of the frame, the other end of said rope being attached to a block D, said block D, adapted to be raised or lowered between the uprights A A and steadied in its movement by the protruding pointed tongue E E, fitting within suitable grooves e on the interior surface of each of the uprights A A, as shown in Fig. 3. The tongue E is adjusted by means of the bolts e e. The block D is secured to the adjustable plate F, having depending therefrom the carriers f f and provided with the elongated slots F' F', adapted to engage with the thumb-screws G G, which thumb-screws pass into the bottom of the block D, the position of the plate F being thus capable of adjustment and the plate capable of being removed from the bottom of the block without changing the position of the block.

The tube-carrier H is secured to the plate F by means of the bolt g passing through the hanger f on the plate F and the collar g', thus providing for the oscillating movement of the tube-carrier about said bolt.

The tube-carrier H has inserted in each end thereof a slitted collar J, (shown in Figs. 8 and 9,) and within the collar J is placed a rubber ring j, all so arranged and adjusted that the tube shall be held in position by the contraction of the collar and rubber, thus supporting the tube rigidly by the exertion of a constant pressure against all sides of the tube simultaneously. The tube-carrier H is also slotted and is provided near each end with lips h h, one on each side of the slot, which may be drawn together by means of the screw I, (shown in Fig. 7,) thus contracting the carrier, the collar, and the rubber ring.

The grinding-rod K, which is slightly curved, is passed through the tube T when it is in position in the carrier and attached at each end to a suitable link k k, which is attached each to an arm L L. The arms L L are joined at their ends with a suitable shaft *l*, mounted within the uprights A A and operated by a lever M, connecting-bar N, and power-wheel O, or in any suitable manner. As thus arranged the motion of the arms L L will cause the rod K to reciprocate within the tube T and in making its movement will cause the tube-carrier to be raised when the arm L approaches the center, and this movement of the tube-carrier is assisted by the compensating weight W acting upon the block D, to which the carrier is secured. The same movement of the arms L and the rod K, carried by them, causes the tube-carrier, and therefore the tube T, to describe the arc of a circle in its movement, thus oscillating the carrier upon the bolt *g*. When the arms have moved to their extremity, the position occupied will be that represented by dotted lines in Fig. 2. It will be noticed that this movement of the rods and the tube causes an action upon the interior surface of the tube by the rod in the form of the arc of a circle of which the center or tangential point will be the center of the tube, and, the operation of the rod being fixed definite and positive, the points of contact will be the same throughout its whole length, so that the difference in the diameter of the tube when completed will be equal on each side of the center.

In order to provide for the different lengths of tubes, and therefore of rods, necessary, I show in Fig. 2 a means for adjusting the angle made by the arms L to each other by the use of the holders *m m* with two sets of bolt-eyes *n n*, making a very common and ordinary adjustment.

I have shown a modified form of carrier in the figures on the third page of the drawings. This is for the purpose of providing for different sizes of tubes where the difference is too great to be provided for by the slotted holder already described. Thus I form the holder in two sections, upper 20 and lower 21, providing for the upper a V-shaped plate 20 or two plates secured together in the manner shown in Fig. 12, which comes in contact with the tube T. The lower portion is provided with overlapping surfaces on each side which clasp the sides of the plate 20, and by means of a semicircular clamping-piece 23, provided with a rubber disk 22, actuated by a screw 24, passing through the under portion of the plate 21 the V-shaped plate 20 and the lower plate 21 may be drawn toward each other and the tube held securely between them, as shown in Fig. 12.

Fig. 16 shows a modified form of clasp for engaging with the end of the rod K, it being apparent that the V-shaped block 25, operated by the screw 26 within the elongated space 27, will allow for the insertion and adjustment of any size rod required.

I have shown in the foregoing a means for constructing a spirit-level tube peculiarly adapted for use in the adjustment of mechanical instruments in which the horizontal and perpendicular are required to be adjusted to great nicety; but I do not limit myself to the particular construction of the carrier or means for imparting motion to the grinding-rod, as the construction of a glass tube in which the center differs in diameter from every other portion of the tube and has its adjacent parts differing in a gradual, predetermined, and slight degree is the essence of my invention and may be accomplished by a modification of the parts of my machine, but which are equivalents thereof.

What I claim as my invention, and desire to secure by Letters Patent, is—

1. A machine for grinding glass tubes consisting of a tube-carrier, a grinding-rod, an arm connected with said grinding-rod, a means for imparting motion to said arm causing said grinding-rod to reciprocate through a glass tube in said carrier in the path of an arc of a circle grinding the interior of the tube in such a manner that midway between the ends of the tube the diameter will be greater than at any other portion of the tube, its adjacent parts differing in a gradual predetermined slight degree, substantially as described and for the purpose set forth.

2. In a machine for grinding glass tubes, a tube-carrier, a pivoted connection between said carrier and a suitable hanger, a compensating weight connected with said hanger, a frame within which said hanger is adjusted, a rod connected by arms, a means for putting said arms in motion causing said rod to reciprocate within a tube placed in the carrier, substantially as described and for the purpose set forth.

3. In a machine for grinding tubes, a tube-carrier consisting of two parts, the upper of said parts provided with a V-shaped opening adapted to engage with a tube, the lower of said parts provided with upwardly-extending arms adapted to engage with the sides of the upper of said parts, a clamping plate and screw arranged to engage with a tube placed within said opening, said carrier mounted within a frame capable of vertical and oscillating motion, with a grinding-rod passing through a tube placed in said carrier, with a means for imparting reciprocal motion to said rod, substantially as described and for the purpose set forth.

THEODORE W. VAN HOESEN.

Witnesses:
MILTON VAN HOESEN,
CHARLES P. FERGUSON.